Sept. 9, 1969  J. J. COLLETTI  3,465,902
CANE PLANTING APPARATUS
Filed Sept. 28, 1967  3 Sheets-Sheet 1
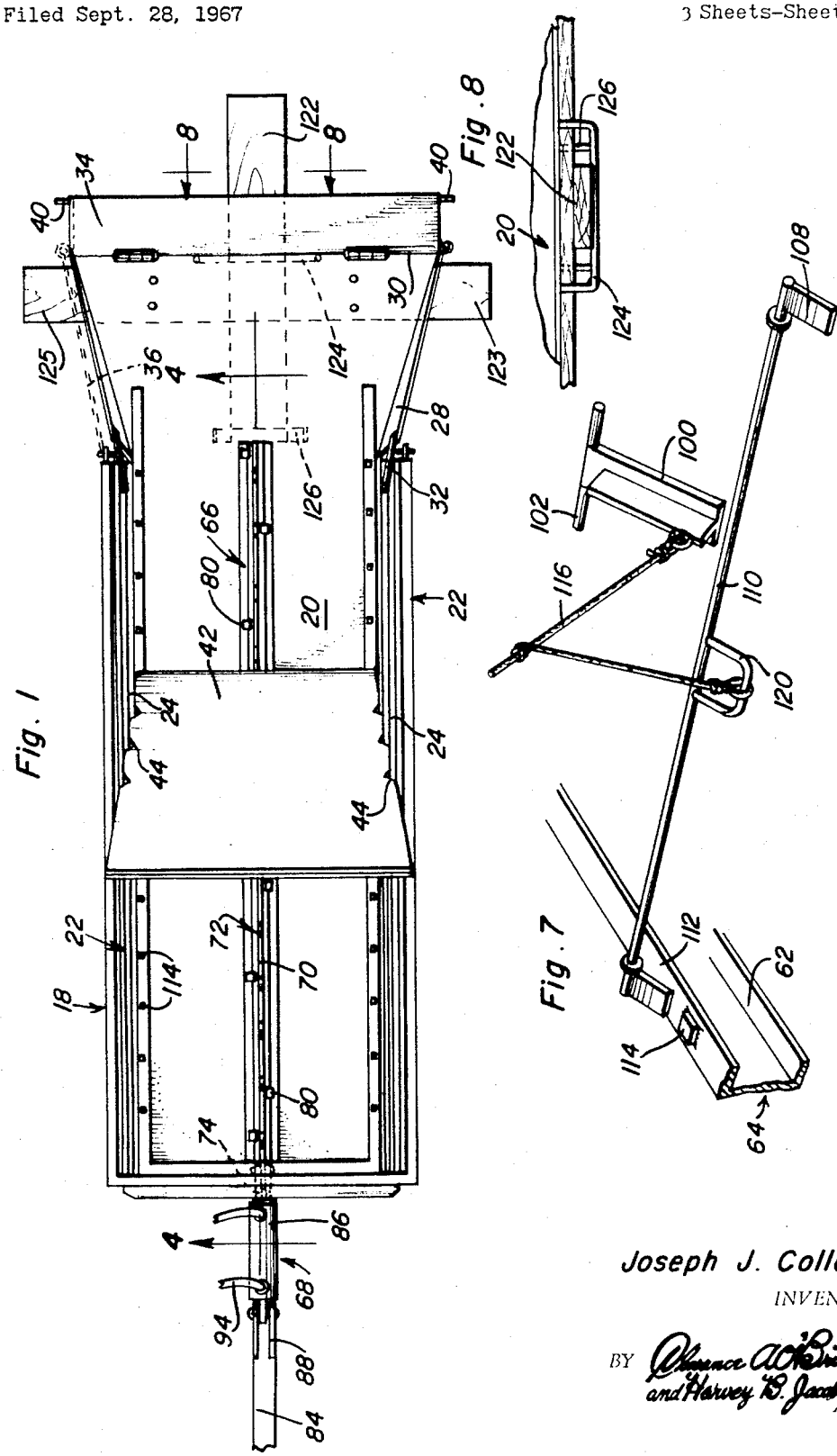
Joseph J. Colletti
INVENTOR.

Sept. 9, 1969　　　　　　J. J. COLLETTI　　　　　3,465,902
CANE PLANTING APPARATUS
Filed Sept. 28, 1967　　　　　　　　　　3 Sheets-Sheet 2

Joseph J. Colletti
INVENTOR.

BY
*Clarence A. O'Brien*
*and Harvey B. Jacobson*
Attorneys

Sept. 9, 1969   J. J. COLLETTI   3,465,902
CANE PLANTING APPARATUS
Filed Sept. 28, 1967   3 Sheets-Sheet 3
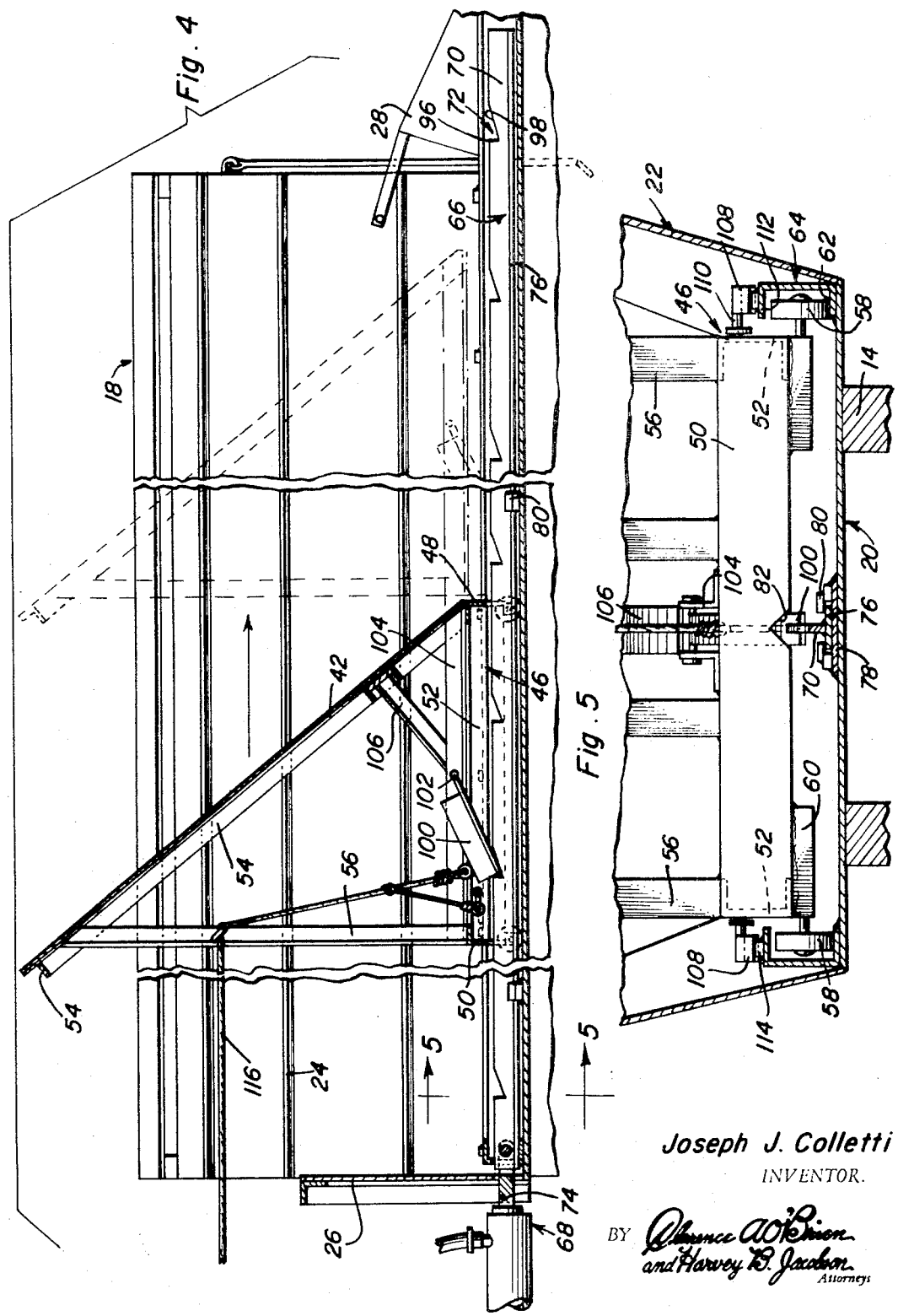
Joseph J. Colletti
INVENTOR.

United States Patent Office 3,465,902
Patented Sept. 9, 1969

3,465,902
CANE PLANTING APPARATUS
Joseph J. Colletti, 2907 Main St. W.,
Jeanerette, La. 70544
Filed Sept. 28, 1967, Ser. No. 671,251
Int. Cl. B60p 1/00; A01c 11/02
U.S. Cl. 214—82                    9 Claims

ABSTRACT OF THE DISCLOSURE

A wagon which receives sugar cane stalks loaded thereon against a discharge panel which is mounted for selective longitudinal movement along the wagon from the front to the rear end thereof so as to effect a rearward movement of the cane as the cane is manually removed from the rear of the wagon for planting. A ratchet bar controlled by a double-acting power cylinder reciprocates so as to selectively advance the discharge panel.

---

The instant invention is generally concerned with cane planting apparatus, and more particularly relates to a wagon, tractor pulled, upon which the cane is stacked and selectively taken from the rear thereof for planting as the wagon simultaneously traverses a plurality of planting rows.

It is a primary purpose of the instant invention to provide a cane wagon which, in addition to transporting the cane along the planting path, operates so as to automatically move the cane rearwardly along the body of the wagon so as to maintain the cane always readily accessible at the rear of the wagon for manual removal therefrom and introduction into the planting rows.

Another significant object of the instant invention resides in the utilization of positive acting means for effecting a smooth periodic movement of the bulk of cane in the wagon.

Further, it is an important object of the instant invention to provide unique apparatus constructed so as to provide a highly efficient trouble-free device which will insure trouble-free field operation.

Figure 6:
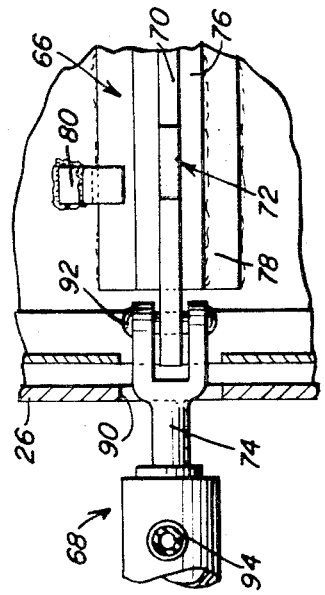
Figure 2:
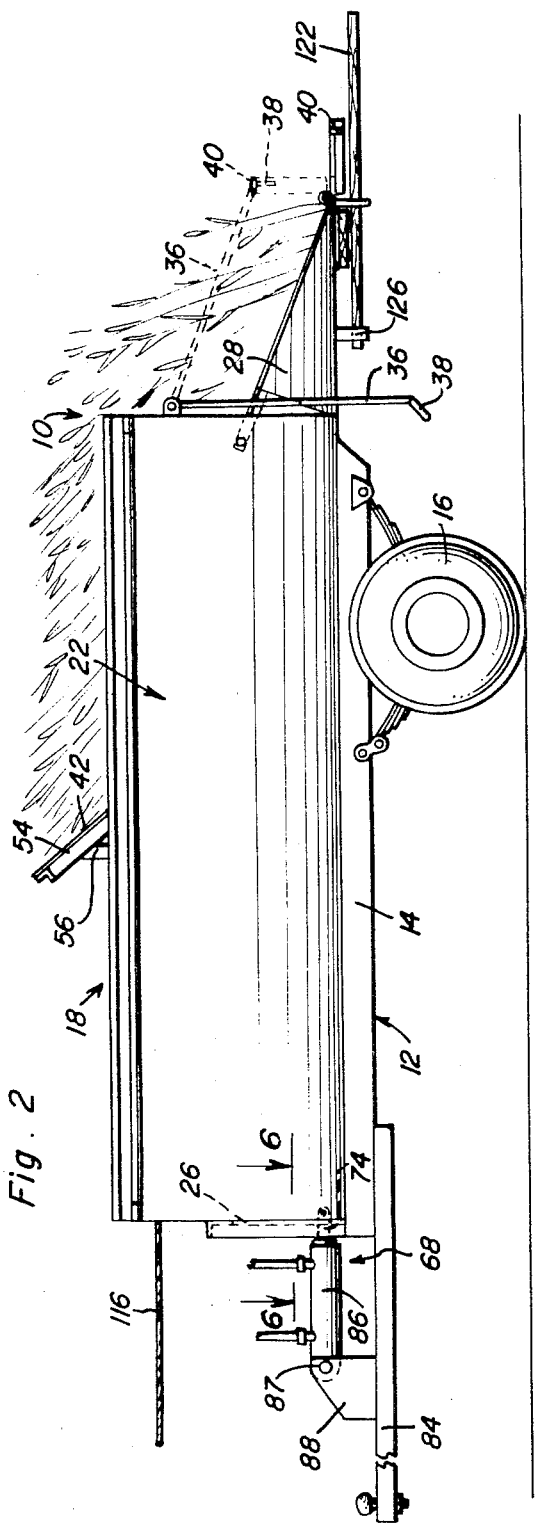
Figure 3:
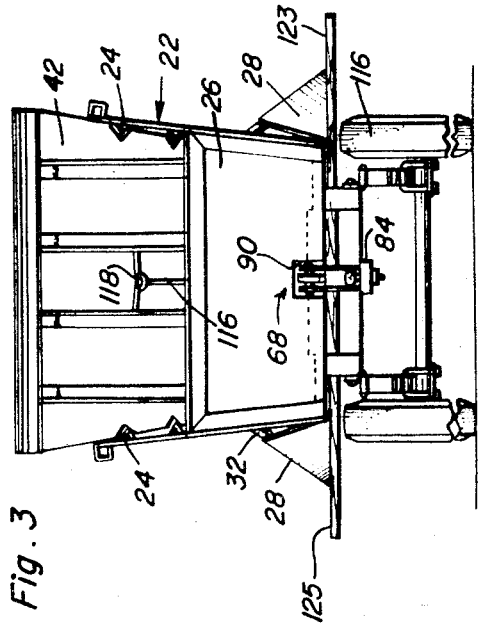

These together with other objects and advantages which will become subsequently apparent reside in the detail of construction and operation as more fully hereinafter described and claimed, reference being had to the accompanying drawings forming a part hereof, wherein like numerals refer to like parts throughout, and in which:

FIGURE 1 is a top plan view of the apparatus of the instant invention;
FIGURE 2 is a side elevational view of the apparatus;
FIGURE 3 is a front elevational view;
FIGURE 4 is a longitudinal cross-sectional view taken substantially on the plane passing along line 4—4 in FIGURE 1;
FIGURE 5 is a cross-sectional detail taken substantially on a plane passing along line 5—5 in FIGURE 4;
FIGURE 6 is an enlarged cross-sectional detail taken substantially on a plane passing along line 6—6 of FIGURE 2;
FIGURE 7 is a perspective detail of the pawl construction associated with the movable discharge panel; and
FIGURE 8 is a cross-sectional detail taken substantially on a plane passing along line 8—8 in FIGURE 1.

Referring now more specifically to the drawings, reference numeral 10 is used to generally designate the cane wagon comprising the instant invention. This wagon includes a chassis 12, including an elongated frame 14 and a pair axle mounted travelling wheels 16 toward the rear thereof, and a cane receiving body 18 supported on the frame or frame means 14.

The wagon body 18 includes an elongated flat bed 20 and opposed upwardly and outwardly inclined side walls 22 secured to and rising from the opposed longitudinal sides or edges of the bed or deck 20. These side walls 22 can, if deemed desirable, include longitudinally extending reinforcing ribs 24 along the inner faces thereof. The forward ends of the side walls 22 will be interconnected by a transversely extending front wall 26 extending from engagement with the front end of the bed 20 to approximately mid-height up the side walls 24. As will be best appreciated from FIGURE 1, the bed 20 extends rearwardly beyond the rear ends of the side walls 22 and is transversely enlarged through opposed outwardly angled edges from which upwardly inclined tapered cane guiding wing portions 28 extend. These wing portions or wings 28 can be integrally formed with the transversely enlarged portion of the bed 20 and will be of a relatively low height tapering rapidly downward toward the rearmost end 30 of the deck 20 so as to, while providing for a positive guiding of the cane, not interfere with the free access thereto by those persons manually removing the cane for the planting thereof. If deemed desirable, a bracing strap 32 can be engaged between the forward edge of each wing 28 and the adjacent side wall 22. Thus, it will be appreciated that an enlarged discharge end is provided on the wagon, allowing ready access to the cane by several persons in a manner which shall be described presently. For transportation purposes, an appropriate tailgate 34 is hingedly or pivotally mounted to the rear end 30 of the bed 20 for movement between substantially horizontal and vertical positions as suggested in FIGURE 2. In order to maintain the tailgate 34 closed, a pair of holding rods 36 are pivotally secured to the rear portions of each side wall 22, each rod 36 including a laterally directed end 38 selectively receivable within a collar or sleeve 40 provided on the corresponding end of the tailgate 34.

As will be appreciated, it is an intention of the instant invention to provide for the rearward movement of a load of cane along the wagon body 18 for easy access thereto by the planters located to the rear of the wagon. Accordingly, an enlarged discharge panel 42 is mounted within the wagon body 18 for longitudinal movement therealong between the front end thereof and approximately the rear of the side walls. This discharge panel 42 is forwardly inclined at approximately 50° to the horizontal so as to enable an inclined stacking of the can thereagainst in a manner which facilitates both a proper stacking of the cane and a proper movement of the cane rearward for easy access thereto by the manual planters. In other words, as the cane is moved rearwardly along the wagon body 18, the lower ends will be presented in a relatively uniform manner to the manual planters for a simplified removal of the cane from the wagon body and an introduction of the cane into the planting rows being traversed.

As will be appreciated, the discharge panel 42 should closely conform to the side walls 22 so as to insure a proper movement of all the stacked cane. Accordingly, the opposed vertical edges of the panels 42 are appropriately notched as at 44 to accommodate the ribs 24 on the side walls 22. These ribs 24, being received through the panel notches 44, also tend to guide the panel 42 during its movement longitudinally along the wagon body 18.

In order to movably mount the discharge panel 42, an appropriate frame is provided. This frame includes a rectangular base 46 formed of four channel beams, comprising front and rear beams 48 and 50, and opposed side beams 52. The panel 42 has the forward lower edge thereof engaged with the front base bam 48 which in effect provides a depending vertical continuation of the panel 42. The rear face of the panel 42 is provided with a plurality of bracing bars or ribs 54 extending both vertically therealong and transversely across at least the upper edge thereof. Rigid vertical posts 56 are provided between the rear base beam 50 and the upper portion of the panel 42 located thereabove, these posts 56 normally being welded or otherwise rigidly affixed to the panel bracing bars 54.

The base 46 is itself supported for rolling engagement longitudinally along the wagon bed 20 by means of front and rear sets of free rolling wheels 58 projecting laterally from the front and rear base beams 48 and 50 and affixed thereto by suitable journal or bearing units 60. The two wheels along each side of the base 46 are received on a pair of opposed tracks 62 defined on the lower horizontal flanges of opposed longitudinally extending channel bars 64 welded or otherwise rigidly affixed to the wagon bed 20 along a major portion of the length thereof.

The actual movement of the discharge panel 42 rewardly along the wagon body 18 is effected by an elongated ratchet bar 66 reciprocated centrally along the wagon bed 20 by means of a double-acting hydraulic piston and cylinder unit 68. The ratchet bar 66 is in the nature of a T-bar with the stem portion 70 projecting vertically and incorporating a series of ratchet notches 72 along the length thereof at equally spaced points generally corresponding to the stroke of the piston 74 of the unit 68. The cross-head portion 76 of the T-bar 66 slides on a horizontal bearing plate 78 welded centrally along the bed 20 with this head portion 76 being retained on the plate 78 by a series of opposed guides 80 fixed to the plate 78 and overlying the opposed edges of the bar portion 76 in a manner which allows for a longitudinal reciporcation of the ratchet bar 66 along a predetermined path. As will be appreciated from the drawings, the bar 66 extends from adjacent the front wall 26 of the wagon body 18 to approximately the rear edges of the side walls 22, underlying the frame base 46. Accordingly, the forward and rear beams 48 and 50 include bar accommodating notches 82 therein so as to not interfere with the movement of the bar 66.

With reference to FIGURE 2, it will be noted that the hydraulic unit 68 is mounted forward of the front wall 26 on an appropriate trailer tongue 84, the forward end of the cylinder 86 of the unit 68 being pinned, as at 87, to a vertically projecting rigid abutment means 88 on the tongue structure 84, while the piston 74 projects inwardly through an appropriate opening 90 in the front wall 26 for pinned engagement, as at 92, with the front end of the ratchet bar 66, attention being directed to FIGURE 6 for illustration of this latter feature. As noted previously, the hydraulic unit 68 is to be double-acting with the fluid lines 94 being, if so desired, tied in with hte hydraulic system of a tractor or the like which will be utilized in towing the cane wagon 10. By the same token, appropriate controls for the unit 68 can be provided either at a convenient location on the exterior of the wagon 10 or on the towing vehicle itself.

Each of the ratchet notches 72 is provided with a vertical forward wall 96 and an inclined bottom wall 98, the vertical front wall 96 of each notch acting so as to selectively engage a pawl 100 mounted on the discharging panel supporting frame for effecting a forward movement thereof in conjunction with a forward movement of the ratchet bar 66 resulting from an extension of the piston 74. This pawl 100, preferably in the nature of a T-bar, is pivotally mounted for swinging movement in a vertical plane about a horizontal axis defined by a pin 102 rigid with the mounted end of the pawl 100 and projecting transversely through a pair of rails 104 mounted longitudinally and centrally across the base 46 of the panel frame. These rails 104 are welded fast to the upper surfaces of the front and rear beams 48 and 50 and are laterally spaced a distance sufficient so as to allow for the free vertical pivoting of the pawl 100 therebetween. An additional bracing of the rails 104 can be provided for by means of a diagonal brace 106 extending between the rear surface of the panel 42 and the rails 104 rearward of the pawl mounting pin 102. In operation, the pawl 100 in its lowered bar engaging position, will be received in one of the bar notches 72 and will hence travel rearwardly in conjunction with a rearward movement of the bar 66 so as to advance the discharge plate 42 the length of the piston stroke. Upon a retraction of the piston 74 into the cylinder 86, the pawl 100 will ride up the inclined bottom wall 98 of the corresponding notch 72 and allow a free sliding of the bar 66 thereunder until such time as the next ratchet notch 72 is reached and receives the pawl 100 freely falling therein. This should coincide with the retracting stroke of the piston 74. At this point, the apparatus is ready to advance the discharge plate 42 another increment.

In order to avoid any tendency for the discharge plate 42 moving forwardly within the wagon 18 upon retraction of the bar 66, due to either a retraction of the bar 66 or the weight of the cane, a pair of check pawls 108 are provided. These check pawls 108 are interconnected by a transverse shaft 110 which is rotatably mounted within the opposed side beams 52 of the base 46 associated with the traveling panel 42. The shaft 110 projects beyond both sides of the base and mounts, at the opposite ends thereof, the check pawls 108 in overlying relation to the top flanges 112 of the track forming longitudinally extending channel bars 64 which overlie the wheels 58. These check pawls 108 ride along the upper surfaces of the flanges 112 as the discharge panel is advanced and periodically drop behind abutments or stops 114 provided along the length of each flange 112 at locations which will provide for an engagement of the check pawls 108 substantially simultaneously with the end of a piston stroke. The check pawls 108 are so related to their stops 114 as to preclude or resist any tendency for the panel unit to move forwardly either in response to a retraction of the ratchet bar 66 or under the weight of the cane. In other words, the stop pawl fixes the position of the discharge panel while the ratchet bar is being retracted for a subsequent incremental advance of the panel 42. When it becomes desirable or necessary to retract the discharge panel 42, both the two check pawls 108 and the main center pawl 100 are vertically retracted through an elongated control cable 116 extending through a guide loop 118 defined in a rigid rod mounted between a pair of centrally located frame posts 56. This cable 116 is engaged directly with the pawl 100 adjacent the free end thereof, and with the check pawl shaft 110, preferably through an appropriate centrally located crank handle 120, whereby a tensioning of the cable or line 116 will effect an upward pivoting of the pawls 100 and 108 so as to move freely over the corresponding abutments as the panel 42 is moved forwardly along the wagon body 18 in any suitable manner, such as through merely a continued pulling on the cable 116.

Returning to the discharge end of the wagon body 18, it is contemplated that three persons ride along therewith for manually removing the advancing cane and planting the cane in three rows which can simultaneously be traversed by the wagon 10. The instant invention contemplates the provision of three seats for such persons, one seat 122 projecting rearwardly beyond the horizontal tailgate 34 generally along the center line of the bed 20 and the other two seats 123 and 125 projecting laterally beyond the opposed sides of the bed 20 at the discharge end. The seat 122 can actually constitute the projecting end of a plank supported beneath the discharge end of the bed 20 by a depending U-shaped bracket 124 immediately at the bed end 30 receiving an intermediate portion of the seat forming plank, and an additional bracket or other appropriate means 126 receiving the inner end of the seat forming plank. As will be appreciated from FIGURE 8, the bracket 124 is to be transversely elongated, thus allowing for a slight lateral pivoting or shifting of the seat 122, the support means 126 also allowing for this lateral shifting of the seat portion 122, so as to accommodate the seat 122 to a particular row orientation so as to make the introduction of the can thereto more convenient for the person utilizing the seat 122. The two lateral seats 123 and 125 constitute the opposite end portions of an elongated plank which extends transversely across the discharge end of the bed 20 immediately therebelow and is either directly bolted or otherwise fastened to the bed 20 or supported on the plank which defines the seat 122, this latter plank being positioned directly under the transverse plank at the central portion thereof.

From the foregoing, it will be appreciated that a highly unique cane wagon has been defined, this wagon providing for the sequential rearward movement of a load of cane for manual removal of the cane as the wagon advances along a plurality of rows. Provision is made for advancing the cane in periodic steps and maintaining the cane in the advanced location until a subsequent advance is desired. In addition, provision is made for three persons to ride on the wagon, at the discharge end thereof, and distribute the cane to the planting rows, the automatic advancing of the cane within the wagon reducing the personnel required from six to three in a normal operation. Incidentally, while not specifically noted supra, it will be appreciated from the phantom line showing in FIGURE 2 that the rods 36 which retain the tailgate 34 also actually function so as to extend the effective height of the relatively low wings 28 so as to allow for a full loading of the wagon 10 during transportation, these rods 36 dropping out of the way during the actual planting operation so as to not interfere with free access to the cane itself.

What is claimed as new is as follows:

1. A planting wagon for cane comprising an elongated bed, laterally spaced upstanding side walls engaged with said bed along the opposed longitudinal sides of said bed, a generally vertical discharge panel movably mounted on said bed and extending transversely between said side walls, said wagon having a forward end and a rear discharge end, means for selectively moving said discharge panel along said wagon between the forward and rear ends thereof to effect a rearward movement of a load therein toward the rear discharge end, a support frame for said discharge panel, said frame comprising a base mounted on a plurality of wheels rollingly engaged with said bed, and a plurality of support members engaged between said base and the discharge panel for the support of the panel on said base, the means for moving said discharge panel comprising an elongated ratchet bar mounted for rearward and forward reciprocal movement along said bed, pawl means on said support frame selectively engaged with said ratchet bar upon rearward movement thereof for a periodic advancing of said frame and the panel supported thereby, means for selectively reciprocating said ratchet bar, said means for selectively reciprocating said bar comprising a fluid cylinder and a piston unit having the cylinder thereof fixed relative to the wagon bed and the piston thereof secured to said ratchet bar, at least one check pawl mounted on the discharge panel support frame, a plurality of stops positioned along said bed for sequential engagement therebehind of the check pawl as the discharge panel support frame is advanced rearwardly, said engaged check pawl acting so as to prevent a retraction of the support frame during the reciprocation of the ratchet bar, said ratchet bar being located centrally along said bed beneath the discharge panel and support frame therefor, and an elongated control cable engaged with said pawl means and said check pawl for effecting a synchronized release thereof and enabling a retraction of the discharge panel.

2. The apparatus of claim 1 wherein said bed, at the discharge end thereof, is laterally enlarged, said side walls terminating forwardly of the laterally enlarged discharge end of said bed.

3. The apparatus of claim 2 including upstanding side wings along the opposed edges of the laterally enlarged end portion of the bed, said wings being of a reduced height relative to the side walls and tapering from a maximum height adjacent the side walls downwardly and rearwardly.

4. The apparatus of claim 3 wherein said discharge panel is upwardly and forwardly inclined relative to the wagon bed.

5. The apparatus of claim 1 wherein said pawl means comprises a pawl pivotally mounted on the support frame for swinging movement in a vertical plane, said pawl being gravity biased into engagement with said ratchet bar, said check pawl also being pivotally mounted on said support frame for swinging movement in a vertical plane and gravity biased downward for engagement with the stops provided therefor, and a cable guide mounted on said support frame above said pawl and check pawl whereby a substantially vertical pull on the cable is effected for producing an upward swinging of the pawl and check pawl.

6. A planting wagon for cane comprising an elongated bed, laterally spaced upstanding side walls engaged with said bed along the opposed longitudinal sides of said bed, a generally vertical discharge panel movably mounted on said bed and extending transversely between said side walls, said wagon having a forward end and a rear discharge end, means for selectively moving said discharge panel along said wagon between the forward and rear ends thereof to effect a rearward movement of a load therein toward the rear discharge end, a support frame for said discharge panel, said frame comprising a base mounted on said bed for movement thereoalong, said means for moving said discharge panel comprising an elongated ratchet bar mounted for rearward and forward reciprocal movement along said bed, pawl means on said support frame selectively engaged with said ratchet bar upon rearward movement thereof for a periodic advancing of said frame and the panel supported thereby, means for selectively reciprocating said ratchet bar, at least one check pawl mounted on the discharge panel support frame, a plurality of stops positioned along said bed for sequential engagement therebehind of the check pawl as the discharge panel support frame is advanced rearwardly, said engaged check pawl acting so as to prevent a retraction of the support frame during the reciprocation of the ratchet bar, and an elongated control cable engaged with said pawl means and said check pawl for effecting a synchronized release thereof and enabling a retraction of the discharge panel.

7. The apparatus of claim 6 wherein said pawl means comprises a pawl pivotally mounted on the support frame for swinging movement in a vertical plane, said pawl being gravity biased into engagement with said ratchet bar, said check pawl also being pivotally mounted on said support frame for swinging movement in a vertical plane and gravity biased downward for engagement with the stops provided therefor, and a cable guide mounted on said support frame above said pawl and check pawl whereby a substantially vertical pull on the cable is effected for producing an upward swinging of the pawl and check pawl.

8. A planting wagon for cane comprising an elongated bed, laterally spaced upstanding side walls engaged with said bed along the opposed longitudinal sides of said bed, a generally vertical discharge panel movably mounted on said bed and extending transversely between said side walls, said wagon having a forward end and a rear discharge end, means for selectively moving said discharge panel along said wagon between the forward and rear ends thereof to effect a rearward movement of a load therein toward the rear discharge end, a support frame for said discharge panel, said frame comprising a base mounted on said bed for movement therealong, said means for moving said discharge panel comprising an elongated ratchet bar mounted for rearward and forward reciprocal movement along said bed, pawl means on said support frame selectively engaged with said ratchet bar upon rearward movement thereof for a periodic advancing of said frame and the panel supported thereby, means for selectively reciprocating said ratchet bar, at least one check pawl mounted on the discharge panel support frame, a plurality of stops positioned along said bed for sequential engagement therebehind of the check pawl as the discharge panel support frame is advanced rearwardly, said engaged check pawl acting so as to prevent a retraction of the support frame during the reciprocation of the ratchet bar, said bed at the discharge end thereof, being laterally enlarged, said side walls terminating forwardly of the laterally enlarged discharge end of said bed, and upstanding side wings along the opposed edges of the laterally enlarged end portion of the bed, said wings being of a reduced height relative to the side walls and tapering from a maximum height adjacent the side walls downwardly and rearwardly, said discharge panel being upwardly and forwardly inclined relative to the wagon bed, said wagon further including personnel receiving seats projecting both longitudinally and laterally from the wagon bed at the enlarged discharge end thereof.

9. The apparatus of claim 8 with the longitudinally projecting seat being laterally adjustable.

References Cited
UNITED STATES PATENTS

| | | | |
|---|---|---|---|
| 2,348,019 | 5/1944 | Norbom | 214—516 |
| 2,712,388 | 7/1955 | Skromme et al. | 214—82 |
| 2,803,357 | 8/1957 | Ronfeldt | 214—82 |
| 2,819,810 | 1/1958 | De Witt | 214—516 |
| 3,176,635 | 4/1965 | Mabon | 111—3 |
| 3,387,745 | 1/1968 | Thibodeaux | 111—2 |

GERALD M. FORLENZA, Primary Examiner

R. J. SPAR, Assistant Examiner

U.S. Cl. X.R.

111—3; 214—83.1